(12) United States Patent
Kuure et al.

(10) Patent No.: US 8,751,652 B2
(45) Date of Patent: Jun. 10, 2014

(54) SERVICE SPECIFIC SUBSCRIBER PRIORITY

(75) Inventors: Pekka Kuure, Espoo (FI); Kirsi Rotsten, Nurmijärvi (FI)

(73) Assignee: Nokia Corporation, Espoo (FI)

( * ) Notice: Subject to any disclaimer, the term of this patent is extended or adjusted under 35 U.S.C. 154(b) by 1069 days.

(21) Appl. No.: 11/019,225

(22) Filed: Dec. 23, 2004

(65) Prior Publication Data

US 2006/0056394 A1 Mar. 16, 2006

(30) Foreign Application Priority Data

Sep. 15, 2004 (EP) ..................................... 04021941

(51) Int. Cl.
*G06F 15/173* (2006.01)
*H04L 12/56* (2006.01)

(52) U.S. Cl.
CPC .................................. *H04L 47/2433* (2013.01)
USPC ........................... 709/226; 709/217; 709/223

(58) Field of Classification Search
USPC ........................................ 709/223, 217, 226
See application file for complete search history.

(56) References Cited

U.S. PATENT DOCUMENTS

| | | | |
|---|---|---|---|
| 6,973,315 B1 * | 12/2005 | Miernik et al. | 455/452.2 |
| 7,127,403 B1 * | 10/2006 | Saylor et al. | 709/217 |
| 7,251,218 B2 * | 7/2007 | Jorgensen | 370/235 |
| 7,318,111 B2 * | 1/2008 | Zhao | 709/250 |
| 2002/0087674 A1 * | 7/2002 | Guilford et al. | 709/223 |
| 2002/0143981 A1 * | 10/2002 | DeLima et al. | 709/233 |
| 2002/0177413 A1 * | 11/2002 | Jouppi et al. | 455/67.1 |
| 2003/0135596 A1 * | 7/2003 | Moyer et al. | 709/223 |
| 2004/0203658 A1 * | 10/2004 | Narayanan | 455/414.1 |
| 2006/0218302 A1 * | 9/2006 | Chia et al. | 709/245 |
| 2007/0081455 A1 * | 4/2007 | Kashima et al. | 370/229 |

* cited by examiner

*Primary Examiner* — Phuoc Nguyen
(74) *Attorney, Agent, or Firm* — Alston & Bird LLP

(57) ABSTRACT

A communication method manages the allocation of Quality of Service using a communication network having an application server providing services and user equipment operated by subscriber The method also includes prioritizing a subscriber according to their subscription details for each service provided. The method also includes allocating Quality of Service for a service provided to user equipment according to the priority of a subscriber operating the respective user equipment.

34 Claims, 2 Drawing Sheets

SERVICE SPECIFIC SUBSCRIBER PRIORITY

FIELD OF THE INVENTION

The present invention relates to a method and system of managing the allocation of Quality of Service as well as a communication device configured therefor.

BACKGROUND OF THE INVENTION

Within the recent developments on the field of the Internet Protocol (IP) Multimedia Subsystem (IMS), it is expected that many types of application servers (AS) are connected to the IMS System. One example thereof is an application server for the Push-to-talk-over-Cellular (PoC) service, which is also known as Push-To-Talk (PTT) service. With the PoC-service, a subscriber can be connected to a number of other subscribers, which are pre-selected by himself/herself by simply pressing a key on the user equipment (UE). This establishes a GPRS-connection, which operates in half-duplex mode. The PoC-service is considered to be one of the first implemented VoIP-applications.

The capabilities of the application server are provided by the IMS. These capabilities can be utilized to implement services for the subscribers and include, for example, the registration of a third party from the IMS towards the application server.

However, if every subscriber maintains one or more real-time Packet Data Protocol (PDP) contexts at the same time, this would bind a lot of expensive packet core and radio resources.

SUMMARY OF THE INVENTION

The present invention is aimed at resolving the shortcomings of the prior art.

The present invention is a communication method comprising managing the allocation of Quality of Service using a communication network having application server providing services and user equipment operated by subscriber, wherein the managing step further comprises prioritizing subscriber according to their subscription details for each service provided; and allocating Quality of Service for a service provided to user equipment according to the priority of a subscriber operating the respective user equipment.

Hence, for example with respect to the specifications of $3^{rd}$ Generation Partnership Project (3GPP), Quality of Service includes traffic classes such as "background", "interactive", "streaming", and "conversational". Thus, With respect to the specifications of the 3GPP, the allocated Quality of Service includes one traffic class of those.

An important advantage of the method according to the present invention is its generality with respect to the Internet Protocol (IP) Multimedia Subsystem (IMS) and the related application server. Thus, according to the present invention, the allocation of packet core resources is optimized.

According to a first modification, the allocating step comprises indicating by the network to the user equipment with which Quality of Service a Packet Data Protocol context to the service is to be requested.

According to a second modification, a provided service is the Push to Talk over Cellular service and a Quality of service to be allocated or not is the streaming traffic class.

According to a third modification, the prioritizing step comprises storing the priorities into a subscription management database of a responsible home subscriber server.

According to a fourth modification, the prioritizing step comprises storing the priorities locally into an application server providing the service with respect to which a subscriber is prioritized.

The present invention is also a communication method comprising managing the allocation of Quality of Service using a communication network having application server providing services and user equipment operated by subscriber, wherein the managing step further comprises prioritizing subscriber according to their subscription details for each service provided; fetching a priority of a subscriber by using a responsible network means during the registration procedure of the respective user equipment operated by the subscriber in the communication network; and allocating Quality of Service for a service provided to user equipment according to the priority of a subscriber operating the respective user equipment.

According to a first modification, the prioritizing step further comprises using several Internet Protocol Multimedia Subsystem public user identities by a subscriber, and storing the priority setting for each of them application server specific into a home subscriber server.

The present invention is also a communication method comprising managing the allocation of Quality of Service using a communication network having application server providing services and user equipment operated by subscriber, wherein the managing step further comprises prioritizing subscriber according to their subscription details for each service provided; storing respective priority information in either one of a subscriber identity module, a UMTS identity module and an Internet Protocol Multimedia Subsystem identity module; and allocating Quality of Service for a service provided to user equipment according to the priority of a subscriber operating the respective user equipment.

Further, the present invention is also a communication method comprising managing the allocation of Quality of Service using a communication network having application server providing services and user equipment operated by subscriber, wherein the managing step further comprises prioritizing subscriber according to their subscription details for each service provided; receiving a respective priority indication of a subscriber after a Session Initiation Protocol session request; and allocating Quality of Service for a service provided to user equipment according to the priority of a subscriber operating the respective user equipment.

According to a first modification thereof, the allocating step comprises indicating by the network to the user equipment with which Quality of Service a Packet Data Protocol context to the service is to be requested.

Moreover, the present invention is a communication system comprising a communication network configured to manage the allocation of Quality of Service, the network having application server configured to provide services and user equipment operated by subscriber; a first communication device configured to prioritize subscriber according to their subscription details for each service provided; and a second communication device configured to allocate Quality of Service for a service provided to user equipment according to the priority of a subscriber operating the respective user equipment.

The system of the present invention includes embodiments and modifications thereof, which are configured such that the methods according to the present invention as well as their modifications can be performed.

Apart from that, the present invention is also a communication device comprising prioritizing means configured to prioritize subscriber according to their subscription details for each service provided to a user equipment operated by the subscriber; and allocating means configured to allocate Quality of Service for a service provided to user equipment according to the priority of a subscriber operating the respective user equipment.

Also the communication device of the present invention includes embodiments and modifications thereof, which are configured such that the methods according to the present invention as well as their modifications can be performed.

These and other modifications, details and advantages of the present invention will become more fully apparent from the following detailed description of the preferred embodiments, which is to be taken in conjunction with the accompanying drawings.

DETAILED DESCRIPTION OF THE PREFERRED EMBODIMENTS

Figure 1:
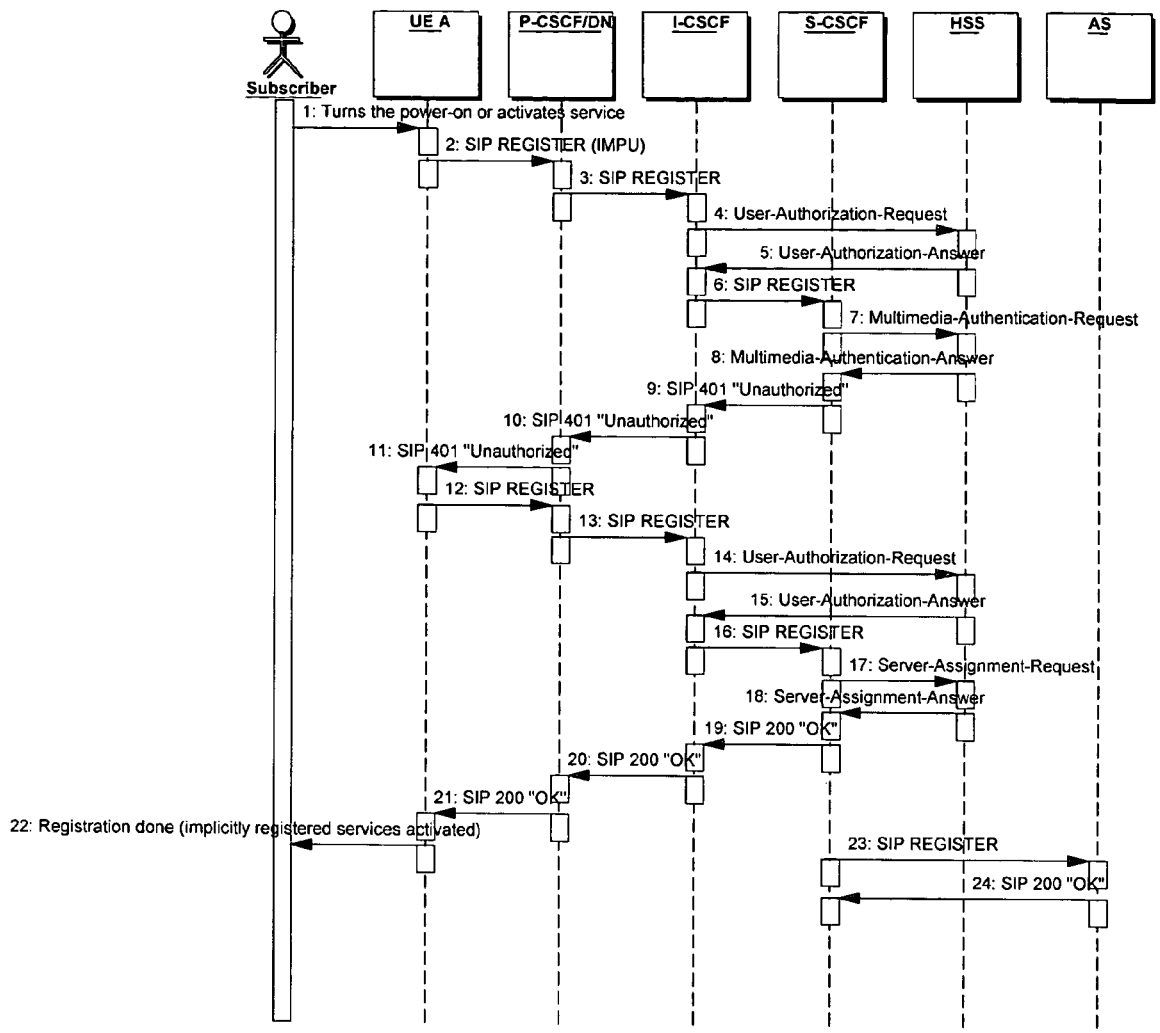
FIG. 1 shows a general registration procedure in the Internet Protocol Multimedia Subsystem (IMS)

In the following, implementation options of the present invention are described which are to be understood as presently preferred embodiments of the present invention.

(First Embodiment)

According to a first preferred embodiment of the present invention, a priority indication of the subscriber is fetched during the registration procedure.

Specifically, according to the first embodiment of the present invention, the subscriber has several IMS public user identities (IMPU). The priority settings are stored application server (AS) specific or generally service specific into a responsible home subscriber server (HSS) for each IMS public user identity (IMPU) of a subscriber.

As an alternative, the priority setting may also concern the whole registered set of the IMS public user identities (IMPU).

According to the first embodiment of the present invention, a serving call state control function (S-CSCF) receives the user profile of a subscriber in question via the Cx-interface during the authentication procedure according to the Session Initiation Protocol (SIP). Then, upon receiving the "SIP 200 response" message to the "REGISTER request" message, a proxy call state control function (P-CSCF) stores a list of uniform resource identifier (URI) with (new) priority settings from a P-Associated-URI header. A P-associated-URI header is a data element which conveys a list of uniform resource identifier that the service provider has allocated to the user.

Further, the user equipment (UE) also stores the expiration time of the registration for the public user identities found in the To header value.

It is to be noted that there is no need to allocate a new IMS public user identity (IMPU) for each service. One IMS public user identity (IMPU) can contain several service specific priority settings.

According to the first embodiment of the present invention, regarding the service, the priority settings list may have to be related to the public identities, to the private identities, or to the IMS subscriptions in the home subscriber server (HSS).

Further, the new data can be transported from the home subscriber server (HSS) to the serving call state control function (S-CSCF) by using the Cx-interface. The data can be placed in the user profile that is loaded to the serving call state control function (S-CSCF) during the registration of the user (which would be the server assignment request/answer command pair—SAR/SAA), and if the preferences are changed in the home subscriber server (HSS), they can be updated to the serving call state control function (S-CSCF) (which would be the Push-Profile Request/Answer command pair—PPR/PPA).

Further, the P-Associated-URI header can have a new tag or that the "SIP 200 OK" message has another indication, wherein it is preferably avoided to carry it in the payload.

Finally, according to the first embodiment, there can be a new session initiation protocol (SIP) extension to carry the application server (AS) service specific priority information to the user equipment (UE).

The advantages according to the first embodiment of the present invention are that the user equipment (UE) can receive the priority information of the subscriber right away during registration. Further, in case the subscriber has a low priority, this can indicate to the user equipment (UE) that the subscriber is not allowed to have the streaming Quality-of-Service (QoS). After this indication, the user equipment (UE) can create a general purpose packet data protocol (PDP) context in order to send a session initiation protocol (SIP) signaling and media through it.

FIG. 1 shows a general registration procedure, where a signaling flow diagram is depicted by illustrating 24 consecutive steps. Specifically, the respective steps denote messages according to the Session Initiation Protocol (SIP) sent between the elements of the IMS as a general registration procedure of a subscriber's user equipment UE A at the application server AS via the network elements proxy call state control function P-CSCF comprising the domain name server DNS, interrogating call state control function I-CSCF, serving call state control function S-CSCF, and home subscriber server HSS. In accordance with the above description, the public identity specific data is received in the message according to step 18, i.e. in the server assignment answer.

Figure 2:
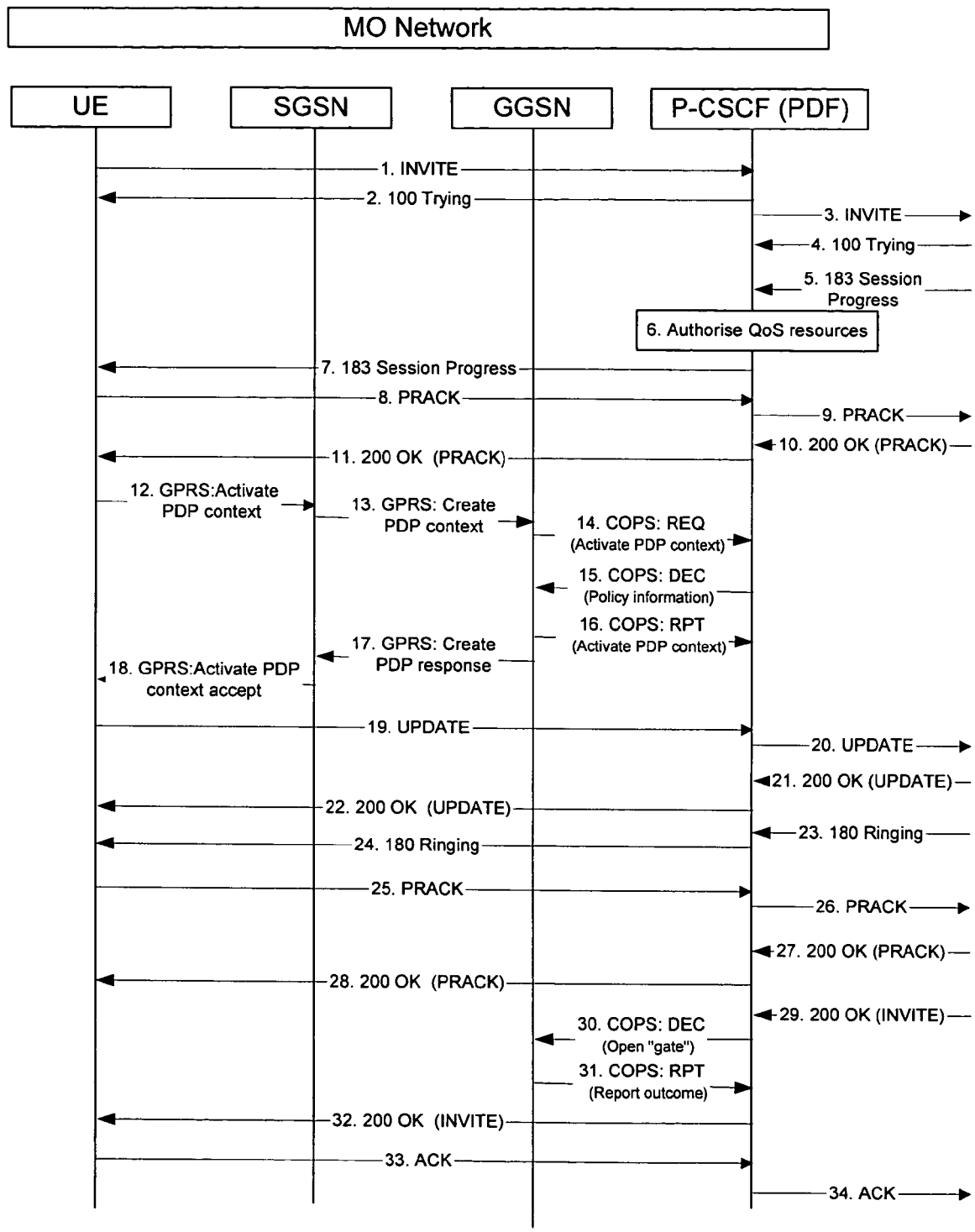
FIG. 2 shows the Interaction between the Session Initiation Protocol/Session Description Protocol, the General Packet Radio Service and the Common Open Policy Service on the mobile originating side.

FIG. 2 shows the interaction between the Session Initiation Protocol/Session Description Protocol, the General Packet Radio Service and the Common Open Policy Service on the mobile originating side. Specifically, illustrated are 34 steps corresponding to respective messages between a user equipment UE, a serving GPRS support node, a gateway GPRS support node, and a proxy call state control function P-CSCF comprising a policy decision function PDF. According to FIG. 2, it is apparent that when a user equipment requests a communication session, the network can indicate to the user equipment which kind of PDP context should be requested i.e. whether to request streaming traffic class or not and whether it is needed to activate another PDP context or not.

In detail, the present embodiment affects step 6. "Authorize Quality of Service resources" and consecutive steps in the way how this is indicated to the user equipment UE and how the user equipment UE reacts and responds back to the network, i.e. to the serving GPRS support node, the gateway GPRS support node, and the proxy call state control function P-CSCF comprising a policy decision function PDF.

The steps for implementing the present invention according to the first embodiment are that the Policy Decision Function (PDF) checks the service indication value and queries the subscriber's service specific priority information from the proxy call state control function's (P-CSCF) database.

Thereafter, the network sends the P-media-Authorization header to the user equipment in the "SIP 183" message. The message is to carry some kind of indication of subscription priority for a requested service.

A modification can be that the IMS network instructs the user equipment to group the media to one or several PDP-contexts, preferably without rejecting the Session Initiation Protocol (SIP) requests.

According to the first embodiment of the present invention, the service specific priority analysis can, for example, receive some kind of service indication in a Session Initiation Protocol (SIP) message or in its payload. The priority information can be stored into the subscription management database of the application server (AS). In this case, the "SIP 183" message is sent from the application server (AS) in order to inform the subscription priority information to the user equipment (UE). A possibility would be to be carried in the message payload, for example. As an alternative, the priority information can also be stored into the proxy call state control function (P-CSCF) by receiving and storing the public identity specific priority information during the registration.

With respect to the Push-to-talk-over-cellular (PoC) service as a particular application example of the present invention, it is to be noted that, according to the first embodiment of the present invention, some terminals may support the secondary Packet Data Protocol (PDP) context activation even if they do not support media authorization such as sending and/or receiving a P-Media-Authorization header. In this case, the secondary Packet Data Protocol (PDP) context activation is up to the local policy of the Gateway GPRS Support Node (GGSN). Further, it is to be noted that when the early session procedure is supported, the user equipment (UE) has enough time to activate a general purpose Packet Data Protocol (PDP) context for a service if the activation of a Packet Data Protocol (PDP) context with streaming Quality of Service (QoS) is not allowed for a certain subscriber.

(Second Embodiment)

According to a second preferred embodiment of the present invention, either one of the subscriber identity module (SIM), the UMTS identity module (USIM) and the IMS identity module (ISIM) contains the above described priority information.

Implementation examples for the second preferred embodiment include that the priority information is stored into either one card of the subscriber identity module (SIM), the UMTS identity module (USIM) and the IMS identity module (ISIM), or that it is loaded into the user equipment (UE). However, in the latter example the new settings can be loaded to the user equipment (UE), or the subscriber identity module (SIM) card, the UMTS identity module (USIM) card or the IMS identity module (ISIM) card can be changed in case new application server (AS) services for end-user are added.

(Third Embodiment)

According to a third preferred embodiment of the present invention, the priority indication of the subscriber is received after a session initiation protocol (SIP) session request.

Specifically, when the user equipment (UE) requests a communication session, the network indicates to the user equipment (UE) whether to request a secondary packet data protocol (PDP) context to the service or not.

In detail, the particular steps of the method according to the third embodiment of the present invention are that the Policy Decision Function (PDF) checks the service indication value and queries the service specific priority information of the subscriber from the internal database of the proxy call state control function (P-CSCF). Then, the network sends the P-Media-Authorization header to the user equipment (UE) in a "SIP 183" message. The message carries some kind of indication of subscription priority for a requested service.

Implementation examples of the third embodiment according to the present invention include that the user equipment (UE) receives a header without the media authorization token, wherein the user equipment (UE) must not activate a secondary packet data protocol (PDP) context for the service in question. In turn, this would also prevent the user equipment (UE) from trying to activate the streaming packet data protocol (PDP) context despite of the priority indication.

According to the third embodiment of the present invention, all service requests can, for example, contain some kind of service indication in a Session Initiation Protocol (SIP) message or in its payload, and the priority information can be stored into the subscription management database of the application server (AS). In this case, the "SIP 183" message is sent from the application server (AS) in order to inform the user equipment (UE) of the subscription priority information which can be carried, for example, in the payload. Alternatively, the priority information can also be stored into the home subscriber server (HSS), wherein the home subscriber server (HSS) and the proxy call state control function (P-CSCF) receive and store the priority information during the registration.

Regarding the Push-to-talk-over-cellular (PoC) service as a particular implementation example of the third embodiment of the present invention, some terminals support a secondary Packet Data Protocol (PDP) context activation even if they do not support media authorization including the sending and/or receiving of a P-Media-Authorization header. In this case, the secondary Packet Data Protocol (PDP) context activation is within the responsibility of the local policy of the Gateway GPRS Support Node (GGSN). Further, when an early session procedure is supported, the user equipment (UE) has enough time to activate a general purpose Packet Data Protocol (PDP) context for a service.

Accordingly, included in the above description is a communication method comprising: managing the allocation of Quality of Service using a communication network having application server providing services and user equipment operated by subscriber, wherein the managing step further comprises prioritizing subscriber according to their subscription details for each service provided; and allocating Quality of Service for a service provided to user equipment according to the priority of a subscriber operating the respective user equipment.

What is described above is what is presently considered as the preferred embodiments of the present invention. However, this is not to be construed as binding the present invention in any way to the disclosed embodiments. Rather, it is to be understood that various modifications and amendments may be made without departing from the spirit and scope of the present invention as defined by the appended claims.

The invention claimed is:

1. A method, comprising:
   managing an allocation of quality of service using a communication network having an application server providing services and user equipment operated by a subscriber, wherein the managing includes:
   prioritizing the subscriber according to subscription details separately for each of at least two services provided, wherein the prioritization is service-specific and further wherein an identity of the subscriber is associated with at least two service-specific priority settings, and
   allocating said quality of service for a service provided to said user equipment according to a priority of the subscriber operating the user equipment, wherein a provided service comprises a push to talk over cellular service and said quality of service to be allocated comprises a streaming traffic class.

2. The method according to claim 1, wherein the allocating comprises indicating, by the communication network to the user equipment, said quality of service to be requested for a packet data protocol context for a service.

3. The method according to claim 1, wherein the prioritizing comprises causing priorities to be stored into a subscription management database of a responsible home subscriber server.

4. The method according to claim 1, wherein the prioritizing comprises causing priorities to be stored locally into the application server providing the service with respect to which the subscriber is prioritized.

5. The method according to claim 1, further comprising:
causing the priority of the subscriber to be fetched by using a responsible network entity during a registration procedure of the user equipment operated by the subscriber in the communication network.

6. The method according to claim 5, wherein the prioritizing further comprises:
using several internet protocol multimedia subsystem public user identities by the subscriber; and
causing a priority setting to be stored for each of the identities according to a specific application server into a home subscriber server.

7. The method of claim 1, further comprising:
causing respective priority information to be stored in one of a subscriber identity module, a universal mobile telecommunications system identity module, or an internet protocol multimedia subsystem identity module.

8. The method of claim 1, further comprising:
receiving a respective priority indication of the subscriber after a session initiation protocol session request.

9. The method according to claim 8, wherein the allocating comprises causing said quality of service to be requested for a packet data protocol context for a service to be indicated by the communication network to the user equipment.

10. A system, comprising:
a communication network configured to manage an allocation of quality of service, the communication network having an application server configured to provide services and user equipment operated by a subscriber;
a first network entity configured to prioritize the subscriber according to subscription details separately for each of at least two services provided, wherein the prioritization is service-specific, wherein an identity of the subscriber is associated with at least two service-specific priority settings, and wherein the first network entity is operably connected with the application server providing a push to talk over cellular service; and
a second network entity configured to allocate the quality of service for a service provided to the user equipment according to a priority of the subscriber operating the user equipment,
wherein a connection is configured so that the quality of service to be allocated to the subscriber comprises a streaming traffic class.

11. The system according to claim 10, wherein the communication network is further configured to indicate, to the user equipment, with which quality of service a packet data protocol context for a service is to be requested.

12. The system according to claim 10, further comprising:
a home subscriber server having a subscription management database, wherein the first network entity is operably connected with a home subscriber service so that the priorities are stored into a subscription management database.

13. The system according to claim 10,
wherein the first network entity is operably connected with the application server providing the service with respect to which the subscriber is prioritized, and
wherein a connection is configured so that priorities are stored locally into the application server.

14. The system according to claim 10, further comprising:
a third network entity configured to fetch the priority of the subscriber by using a responsible network entity during a registration procedure of the user equipment operated by the subscriber in the communication network.

15. The system according to claim 14, further comprising a home subscriber server,
wherein the first network entity is further configured to use several internet protocol multimedia subsystem public user identities for the subscriber, and
wherein the home subscriber server and the first network entity are operably connected to store a priority setting for each of the internet protocol multimedia subsystem public user identities according to a specific application server into the home subscriber server.

16. The system according to claim 10, further comprising:
a third network entity configured to store respective priority information in one of a subscriber identity module, a universal mobile telecommunications system identity module and an internet protocol multimedia subsystem identity module.

17. An apparatus comprising at least one processor and at least one memory device, the at least one processor being configured to, with the memory device, cause the apparatus at least to:
prioritize a subscriber according to subscription details separately for each of at least two services provided to a user equipment operated by the subscriber, wherein the prioritization is service-specific and further wherein an identity of the subscriber is associated with at least two service-specific priority settings; and
allocate quality of service for a service provided to the user equipment according to a priority of the subscriber operating the user equipment,
wherein the apparatus is configured to be operably connected to an application server providing a push to talk over cellular service so that the quality of service to be allocated to the subscriber comprises a streaming traffic class.

18. The apparatus according to claim 17, wherein the apparatus is further caused to indicate, to the user equipment, with which quality of service provided by an application server a packet data protocol context for a service is to be requested.

19. The apparatus according to claim 17, wherein the apparatus is operably connected with a subscription management database of a responsible home subscriber server that stores priorities into the database.

20. The apparatus according to claim 17, wherein the apparatus is operably connected with an application server providing the service with respect to which the subscriber is prioritized, to store priorities locally into the application server.

21. The apparatus according to claim 17, wherein the at least one processor is further configured to, with the memory device, cause the apparatus at least to:
fetch the priority of the subscriber during a registration procedure of the user equipment operated by the subscriber in a communication network of the apparatus.

22. The apparatus according to claim 21,
wherein the apparatus is operably connected to an application server and to a home subscriber server, and
wherein the apparatus is further caused to:
use several internet protocol multimedia subsystem public user identities by the subscriber, and
store a priority setting for each of the identities according to a specific application server into the home subscriber server.

23. The apparatus according to claim 17, wherein the at least one processor is further configured to, with the memory device, cause the apparatus at least to:
cause respective priority information to be stored in one of a subscriber identity module, a universal mobile telecommunications system identity module and an internet protocol multimedia subsystem identity module.

24. The apparatus according to claim 17, wherein the at least one processor is further configured to, with the memory device, cause the apparatus at least to:
receive a respective priority indication of the subscriber after a session initiation protocol session request.

25. The apparatus according to claim 24, wherein the apparatus is further caused to indicate, to the user equipment, with which quality of service a packet data protocol context for the service is to be requested.

26. A method, comprising:
prioritizing a subscriber according to subscription details separately for each of at least two services provided to a user equipment operated by the subscriber, wherein the prioritization is service-specific and further wherein an identity of the subscriber is associated with at least two service-specific priority settings; and
allocating a quality of service for a service provided to the user equipment according to a priority of the subscriber operating the user equipment,
wherein a provided service comprises a push to talk over cellular service and said quality of service to be allocated comprises a streaming traffic class.

27. The method according to claim 26, further comprising:
causing a quality of service provided by an application server for a packet data protocol context for a service that is to be requested to be indicated.

28. The method according to claim 26, further comprising:
causing the priority of the subscriber to be fetched during a registration procedure of the user equipment operated by the subscriber in a communication network.

29. The method according to claim 28, further comprising:
using several internet protocol multimedia subsystem public user identities by the subscriber; and
causing a priority setting for each of the identities to be stored according to a specific application server into the home subscriber server.

30. The method according to claim 26, further comprising:
causing respective priority information to be stored in one of a subscriber identity module, a universal mobile telecommunications system identity module, or an internet protocol multimedia subsystem identity module.

31. The method according to claim 26, further comprising:
receiving a respective priority indication of the subscriber after a session initiation protocol session request.

32. The method according to claim 31, further comprising:
causing the quality of service that is to be requested for a packet data protocol context for the service to be indicated.

33. An apparatus comprising at least one processor and at least one memory, the processor being configured to, with the memory, cause the apparatus at least to:
receive, from a network, service-specific prioritization information that, according to subscription details, separately prioritizes a subscriber for each of at least two services provided by an application server and wherein an identity of the subscriber is associated with at least two service-specific priority settings; and
based on the service-specific prioritization information, cause a bearer to be requested for a given service provided by the application server to the apparatus,
wherein the application server provides a push to talk over cellular service so that a quality of service to be allocated to the bearer comprises a streaming traffic class.

34. The apparatus of claim 33, wherein the apparatus further comprises a wireless receiver configured to receive a wireless communication including the service-specific prioritization information.

* * * * *